(12) United States Patent
Nishi et al.

(10) Patent No.: US 7,104,261 B2
(45) Date of Patent: Sep. 12, 2006

(54) INTERNAL COMBUSTION ENGINE BLOWBY GAS CRANKCASE EMISSION CONTROL SYSTEM

(75) Inventors: Tohru Nishi, Saitama (JP); Hideyuki Tawara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 33 days.

(21) Appl. No.: 10/928,117

(22) Filed: Aug. 30, 2004

(65) Prior Publication Data

US 2005/0081837 A1 Apr. 21, 2005

(30) Foreign Application Priority Data

Sep. 10, 2003 (JP) ............................. 2003-318377

(51) Int. Cl.
*F02M 25/06* (2006.01)
(52) U.S. Cl. ...................................... 123/572
(58) Field of Classification Search ..................... None
See application file for complete search history.

(56) References Cited

U.S. PATENT DOCUMENTS 4,169,432 A * 10/1979 White ......................... 123/574
6,892,716 B1 * 5/2005 Matsuda et al. ............ 123/572

FOREIGN PATENT DOCUMENTS

JP 61-198512 U 12/1986

* cited by examiner

*Primary Examiner*—Andrew M. Dolinar
(74) *Attorney, Agent, or Firm*—Birch, Stewart, Kolasch & Birch, LLP

(57) ABSTRACT

To provide a crankcase emission control system that enables the miniaturization of an internal combustion engine and the reduction in the manufacturing cost. In a crankcase emission control system of an internal combustion engine, a collecting part for collecting blowby gas conveyed in a breather tube on the case side and a breather tube on the cylinder head side and directing the blowby gas to a breather tube on the air cleaner side is provided over a connection, a connecting pipe on the case side, of the breather tube on the case side and a breather on the case side, below a connection, a connecting pipe on the cylinder head side, of the breather tube on the cylinder head side and a breather on the cylinder head side and below a connection of the breather tube on the air cleaner side and an air cleaner.

18 Claims, 2 Drawing Sheets

INTERNAL COMBUSTION ENGINE BLOWBY GAS CRANKCASE EMISSION CONTROL SYSTEM

CROSS-REFERENCE TO RELATED APPLICATIONS

The present application is related to Japanese Patent Application No. 2003-318377 filed on Sep. 10, 2003 the entire contents of which are hereby incorporated by reference.

BACKGROUND OF THE INVENTION

1. Field of the Invention

The present invention relates to an internal combustion engine blowby gas crankcase emission control system mounted in a vehicle such as a motorcycle or a four-wheel vehicle.

2. Description of Background Art

To prevent blowby gas that leaks out from a combustion chamber into a crankcase from being emitted into the air, a crankcase emission control system is configured so that blowby gas is returned to the intake side and is again fed to the combustion chamber from there. In addition, a combustion process is applied and provided to an engine which is a representative example of an internal combustion engine. The crankcase emission control system is known that includes a configuration wherein a crankcase and an intake manifold are connected and a cylinder head cover (the inside) is in communication with the crankcase and an air cleaner are connected. See for example, JP-A-61-198512.

However, in a conventional type crankcase emission control system, as blowby gas in a crankcase and in a cylinder head cover is returned to the intake side (an intake manifold and an air cleaner) by using mutually independent paths, a sufficient gas-liquid separation function is required to be provided to the respective paths. More specifically, a large-size gas-liquid separator is required so as to prevent an oil component that is unseparated from blowby gas from being returned to the intake side. Thus, a breather having a large capacity is required to be provided to the cylinder head side or an intricate labyrinth structure is required to be formed with a large-sizing of a cylinder head, that is, an engine (an internal combustion engine). This results in an increase in the manufacturing cost.

SUMMARY AND OBJECTS OF THE INVENTION

The invention is made in view of such a problem and it is an object to provide a crankcase emission control system that enables the miniaturization of an internal combustion engine with a reduction in the manufacturing cost.

To achieve such an object, the internal combustion engine blowby gas crankcase emission control system according to the present invention is provided with a breather on the case side that separates an oil component included in the blowby gas in a crankcase, a breather on the cylinder head side that separates an oil component included in blowby gas on the cylinder head side, a breather tube on the case side one end of which is connected to the breather on the case side, a breather tube on the cylinder head side one end of which is connected to the breather on the cylinder head side with a collecting part connected to the breather tube on the case side and the other end of the breather tube on the cylinder head side and a breather tube on the air cleaner side one end of which is connected to the collecting part and the other end of being connected to an air cleaner. The collecting part is provided over a connection of the breather tube on the case side and the breather on the case side, below a connection of the breather tube on the cylinder head side and the breather on the cylinder head side and below a connection of the breather tube on the air cleaner side and the air cleaner.

In the present invention, it is desirable that the breather tube on the air cleaner side is directed upwardly from a connection with the collecting part.

Further, in the present invention, it is desirable that the inside diameter of the breather tube on the air cleaner side is larger than each inside diameter of the breather tube on the case side and the breather tube on the cylinder head side.

According to the present invention, as the collecting part is provided over the connection of the breather tube on the case side and the breather on the case side, below the connection of the breather tube on the cylinder head side and the breather on the cylinder head side and below the connection of the breather tube on the air cleaner side and the air cleaner, the collecting part functions as a gas-liquid separator of blowby gas that flows from the breather on the cylinder head side and separated oil (liquid) can be returned to the crankcase via the breather tube on the case side (and the breather on the case side) by the action of gravity. Therefore, as the miniaturization of the breather on the cylinder head side or the simplification of the labyrinth structure is enabled. Thus, the miniaturization of the internal combustion engine and a reduction in the manufacturing cost are enabled.

In addition, oil that adheres to the inside of the breather tube on the air cleaner side can be returned to the crankcase via the collecting part and the breather tube on the case side by the action of gravity by directing the breather tube on the air cleaner side upward from the connection with the collecting part.

Further, as the saturation of the gas flow rate in the breather tube on the air cleaner side is avoided by making the inside diameter of the breather tube on the air cleaner side larger than each inside diameter of the breather tube on the case side and the breather tube on the cylinder head side even if blowby gas conveyed in the breather tube on the case side and in the breather tube on the cylinder head side is collected and flows in the breather tube on the air cleaner side, the blowby gas can be efficiently led to the air cleaner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
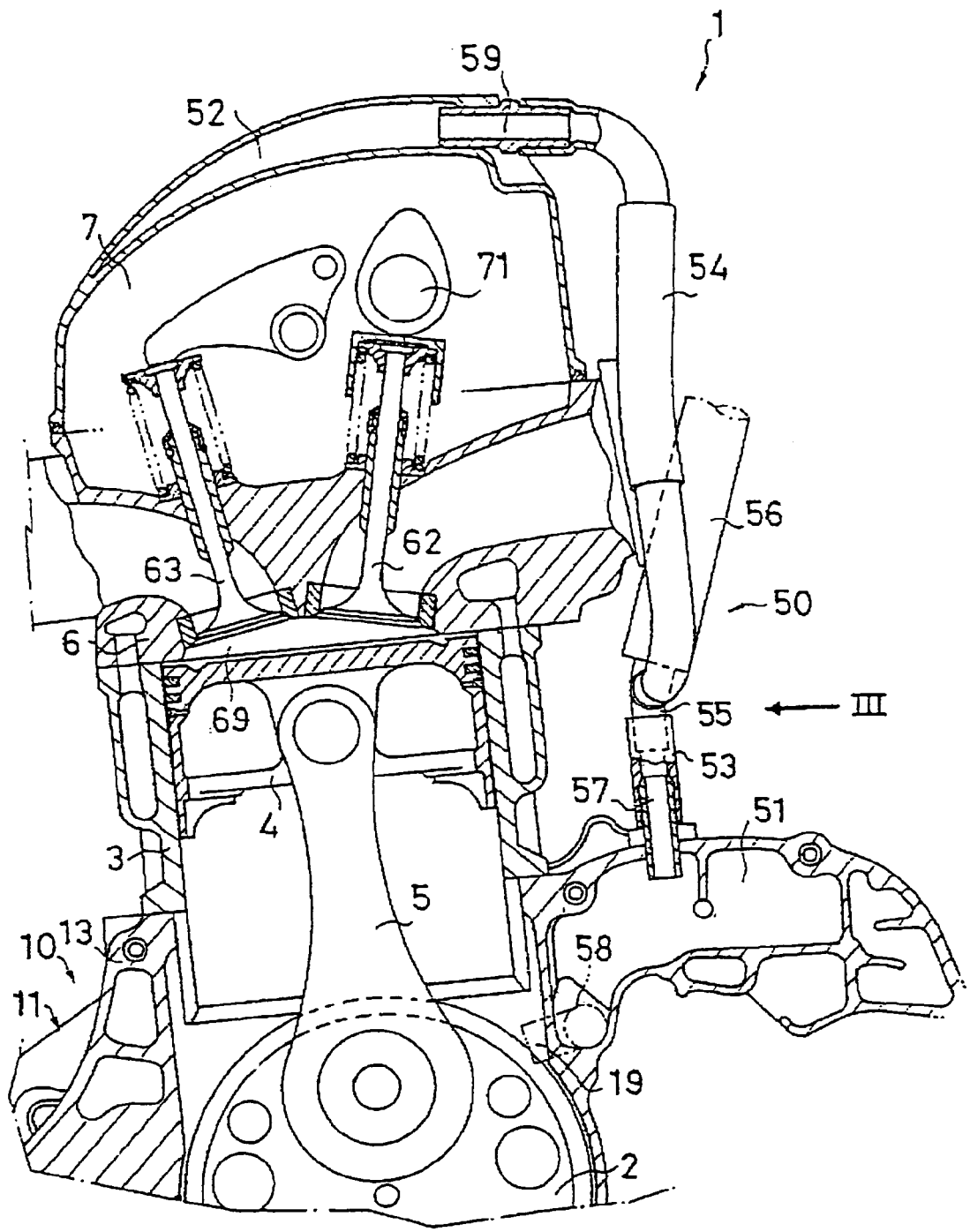
FIG. 1 is an enlarged, partial sectional view showing the left side of a four-cycle engine for a saddle-type vehicle which is an example of an internal combustion engine provided with a crankcase emission control system according to the present invention.

Referring to the drawings, a preferred embodiment of the invention will be described below. FIG. 1 shows a four-cycle engine 1 for a saddle-type vehicle which is an example of an internal combustion engine provided with a crankcase emission control system according to the present invention. The engine 1 is a transverse engine in which a crankshaft 2 is directed in a lateral direction of the vehicle and is mounted in a lower part of the center of the body B (see FIG. 2) of the saddle-type vehicle so that the left side in FIG. 1 is equivalent to a forward direction in a traveling direction of the vehicle.

A crankcase 11 has a structure that is divided into left and right parts and is composed of a left case (not shown) and a right case 13, a crank chamber 19 that can house the crankshaft 2 is formed in the crankcase 11. The crankshaft 2 is housed and held in the crank chamber 19 so that the crankshaft can be rotated. The left side of the left case is covered with a left cover not shown, the right side of the right case 13 is covered with a right cover and a clutch cover (not shown) with a power unit case 10 being formed by the covers.

A crankshaft supporting hole not shown, supporting holes and concave portions for various rotating members are made on the side walls of the left and right cases, the crankcase 11. A cylinder block 3 is connected to the front upper end of the crankcase 11. A piston 4 is housed in the cylinder block 3 so that the piston can be reciprocated and is coupled to the crankshaft 2 via a connecting rod 5. A cylinder head 6 for closing the head of the cylinder block 3 and a cylinder head cover 7 for covering the upside of the cylinder head 6 are connected to the upper end of the cylinder block 3.

Figure 2:
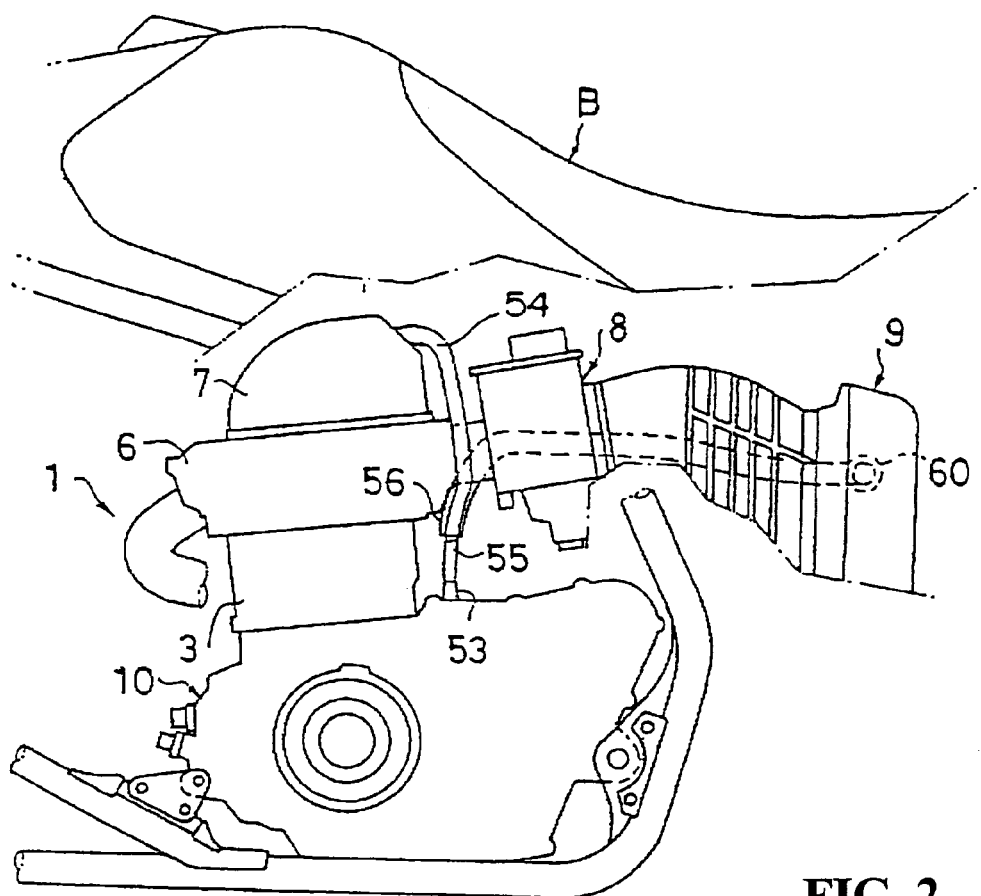
FIG. 2 is an enlarged left side, partial sectional view showing a state in which the engine is mounted in the body.

As shown in FIG. 2, a carburetor 8 is connected to the rear of the cylinder head 6 and an air cleaner 9 is connected to the rear of the carburetor 8. Air cleaned by the air cleaner 9 passes the carburetor 8 and is supplied to a combustion chamber 69 encircled by the piston 4, the cylinder head 6 and the cylinder block 3. In the cylinder head 6, a spark plug not shown, an intake valve 62 and an exhaust valve 63 are arranged. Inside the cylinder head cover 7, a camshaft 71 for operating each valve 62, 63 is held so that the camshaft can be turned. Though the details are not shown, an oil reservoir (not shown) is provided to a lower part of the power unit case 10 and a predetermined amount of oil for lubrication and cooling is reserved.

A crankcase emission control system 50 provided with respect to the engine 1 that is substantially formed as described above will now be described. The crankcase emission control system 50 is provided with a breather on the case side 51 communicating with the crank chamber 19, a breather on the cylinder head side 52 communicating with the cylinder head cover 7, a breather tube on the case side 53 for conveying blowby gas in the breather on the case side 51 to the air cleaner 9, a breather tube on the cylinder head side 54 for conveying blowby gas in the breather on the cylinder head side 52 to the air cleaner 9, a collecting part 55 for collecting blowby gas led into the breather tube on the case side 53 and the breather tube on the cylinder head side 54 and a breather tube on the air cleaner side 56 for conveying the blowby gas collected in the collecting part 55 to the air cleaner 9. See, FIG. 2.

The breather on the case side 51 is provided to the rear of an upper part of the crankcase 11 and an oil component included in the blowby gas that flows inside the breather on the case side 51 can be separated there. A connecting pipe on the case side 57 is attached to the upper end of the breather on the case side 51, the breather tube on the case side 53 is fitted into the connecting pipe on the case side 57, and the breather on the case side 51 and the breather tube on the case side 53 are connected or in communication via the connecting pipe on the case side 57.

An introduction pipe 58 is attached to the left side of a lower end of the breather on the case side 51 and the inside of the breather on the case side 51 and the crank chamber 19 is in communication via the introduction pipe 58. The introduction pipe 58 is an L-type pipe bent substantially forwardly at the left end after it extends to the left from the breather on the case side 51. The introduction pipe 58 functions as a part of the labyrinth structure for preventing oil from directly invading inside the breather on the case side 51.

The breather on the cylinder head side 52 is provided on an upper part of the cylinder head cover 7 and an oil component included in the blowby gas that flows inside the breather on the cylinder head side 52 can be separated there. A communicating port not shown is formed in the breather on the cylinder head side 52, and the inside of the cylinder head cover 7 and the inside of the breather on the cylinder head side 52 communicate via the communicating port. A connecting pipe on the cylinder head side 59 is attached to the rear end of the breather on the cylinder head side 52, the breather tube on the cylinder head side 54 is fitted into the connecting pipe on the cylinder head side 59 and the breather on the cylinder head side 52 and the breather tube on the cylinder head side 54 are connected or are in communication via the connecting pipe on the cylinder head side 59.

The lower end of the breather tube on the case side 53 is connected to the breather on the case side 51 via the connecting pipe on the case side 57. The upper end of the breather tube on the case side 53 is connected to the collecting part 55 and blowby gas in the breather on the case side 51 is led to the collecting part 55. The breather tube on the case side 53 extends vertically.

The upper end of the breather tube on the cylinder head side 54 is connected to the breather on the cylinder head side 52 via the connecting pipe on the cylinder head side 59, the lower end of the breather tube on the cylinder head side 54 is connected to the collecting part 55 and blowby gas in the breather on the cylinder head side 52 is led to the collecting part 55. The breather tube on the cylinder head side 54 extends vertically, is bent forward at the upper end and is bent to the right at the lower end.

Figure 3:
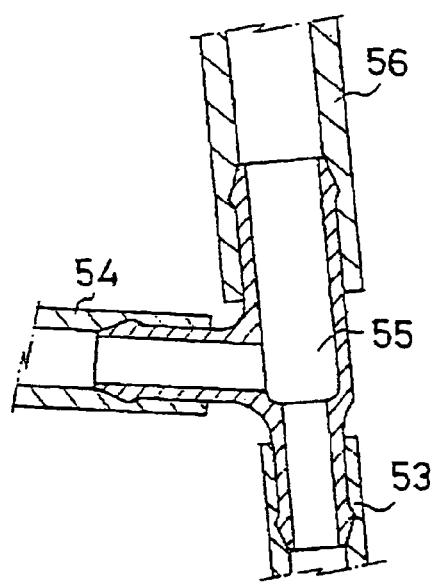
FIG. 3 is an enlarged sectional view viewed from a direction shown by an arrow III in FIG. 1.

The collecting part 55 is a three-forked pipe extended vertically and to the left and upwardly from the center as shown in FIG. 3. The lower end is fitted into the breather tube on the case side 53 and the left upper end is fitted into the breather tube on the cylinder head side 54. Blowby gas conveyed in the breather tube on the case side 53 and the breather tube on the cylinder head side 54 is collected in the collecting part 55. The upper end of the collecting part 55 is fitted into the breather tube on the air cleaner side 56 and blowby gas collected in the collecting part 55 is led to the breather tube on the air cleaner side 56.

The front end of the breather tube on the air cleaner side 56 is connected to the collecting part 55, the rear end is connected to or is in communication with the air cleaner 9 via a collecting pipe on the air cleaner side 60 as shown in FIG. 2, and blowby gas collected in the collecting part 55 is led to the air cleaner 9. The breather tube on the air cleaner side 56 has a shape extending longitudinally and is connected to the collecting part 55 so that the breather tube extends upwardly from a connection with the upper end of the collecting part 55 as shown in FIG. 1 and FIG. 2. Thus, oil that adheres to the inside of the breather tube on the air cleaner side 56 can be returned to the crankcase 11 via the collecting part 55 and the breather tube on the case side 53 and the breather on the case side 51 by the action of gravity.

The inside diameter of the breather tube on the air cleaner side 56 is larger than each inside diameter of the breather tube on the case side 53 and the breather tube on the cylinder head side 54. Thus, as the saturation of a gas flow rate in the breather tube on the air cleaner side 56 is avoided even if blowby gas conveyed in the breather tube on the case side 53 and the breather tube on the cylinder head side 54 is collected and flows in the breather tube on the air cleaner side 56, blowby gas can be efficiently directed to the air cleaner 9.

As shown in FIGS. 1 and 2, the collecting part 55 is provided over a connection to the connecting pipe on the case side 57 of the breather tube on the case side 53 and the breather on the case side 51, below a connection the connecting pipe on the cylinder head side 59 of the breather tube on the cylinder head side 54 and the breather on the cylinder head side 52 and below a connection the connecting pipe on the air cleaner side 60 of the breather tube on the air cleaner side 56 and the air cleaner 9. Thus, the collecting part 55 functions as a gas-liquid separator for the blowby gas that flows from the breather on the cylinder head side 52. Separated oil or liquid can be returned to the crankcase 11 via the breather tube on the case side 53 and the breather on the case side 51 by the action of gravity. Therefore, as the miniaturization of the breather on the cylinder head side 52 or the simplification of the labyrinth structure is enabled, the miniaturization of the engine 1 and the reduction of the manufacturing cost are enabled.

In the four-cycle engine 1 for the saddle-type vehicle configured as described above, when the engine 1 is started, blowby gas that leaks out into the crank chamber 19 passes the induction pipe 58, flows into the breather on the case side 51, passes the connecting pipe on the case side 57 and the breather tube on the case side 53 and is led to the collecting part 55. At this time, an oil component included in the blowby gas is separated in the breather on the case side 51.

Blowby gas that flows inside the cylinder head cover 7 flows into the breather on the cylinder head side 52 via the communicating port not shown, passes the connecting pipe on the cylinder head side 59 and the breather tube on the cylinder head side 54 and is led to the collecting part 55. At this time, an oil component included in the blowby gas is separated in the breather on the cylinder head side 52.

The blowby gas conveyed in the breather tube on the case side 53 and the breather tube on the cylinder head side 54 is collected in the collecting part 55, passes the breather tube on the air cleaner side 56 and the connecting pipe on the air cleaner side 60 and is taken inside the air cleaner 9. At this time, the collecting part 55 functions as a gas-liquid separator of the blowby gas that flows from the breather on the cylinder head side 52 and separated oil or liquid is returned to the crankcase 11 via the breather tube on the case side 53 and the breather on the case side 51 by the action of gravity. As the breather tube on the air cleaner side 56 is connected to the collecting part 55 so that the breather tube on the air cleaner side 56 extends upwardly from a connection with the upper end of the collecting part 55, oil that adheres to the inside of the breather tube on the air cleaner side 56 is returned to the crankcase 11 via the collecting part 55 and the breather tube on the case side 53 and the breather on the case side 51 by the action of gravity.

The blowby gas taken in the air cleaner 9 passes the carburetor 8 again, is led into the combustion chamber 69 and a combustion process is applied. As described above, blowby gas that leaks out into the crank chamber 19 and inside the cylinder head cover 7 is returned to the combustion chamber again without being emitted into the air.

According to the crankcase emission control system 50 of the engine configured as described above, as the collecting part 55 is provided over the connection the connecting pipe on the case side 57 of the breather tube on the case side 53 and the breather on the case side 51, below the connection the connecting pipe on the cylinder head side 59 of the breather tube on the cylinder head side 54 and the breather on the cylinder head side 52 and below the connection the connecting pipe on the air cleaner side 60 of the breather tube on the air cleaner side 56 and the air cleaner 9, the collecting part 55 functions as a gas-liquid separator for blowby gas that flows from the breather on the cylinder head side 52 and separated oil or liquid can be returned to the crankcase 11 via the breather tube on the case side 53 and the breather on the case side 51 by the action of gravity. Therefore, the miniaturization of the breather on the cylinder head side 52 or the simplification of the labyrinth structure is enabled. Thus, aminiaturization of the engine 1 and a reduction in the manufacturing cost are enabled.

Oil that adheres to the inside of the breather tube on the air cleaner side 56 can be returned to the crankcase 11 via the collecting part 55 and the breather tube on the case side 53 by the action of gravity by directing the breather tube on the air cleaner side 56 from the connection with the upper end of the collecting part 55 upward.

Further, as the saturation of the gas flow rate in the breather tube on the air cleaner side 56 is avoided by making the inside diameter of the breather tube on the air cleaner side 56 larger than each inside diameter of the breather tube on the case side 53 and the breather tube on the cylinder head side 54 even if blowby gas conveyed in the breather tube on the case side 53 and the breather tube on the cylinder head side 54 is collected and flows in the breather tube on the air cleaner side 56, the blowby gas can be efficiently led to the air cleaner 9.

In the above-mentioned embodiment, the four-cycle engine 1 for the saddle-type vehicle is used for the internal combustion engine provided with the crankcase emission control system according to the present invention. However, the present invention is not limited to this and the invention can be applied to an internal combustion engine provided with a breather to a cylinder head and a crankcase.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine blowby gas crankcase emission control system, comprising:

a breather on a case side for separating an oil component included in a blowby gas in a crankcase;

a breather on a cylinder head side for separating an oil component included in a blowby gas on the cylinder head side;
a breather tube on the case side one end of which is connected to the breather on the case side;
a breather tube on the cylinder head side one end of which is connected to the breather on the cylinder head side;
a collecting part to which the breather tube on the case side and the other end of the breather tube on the cylinder head side are connected; and
a breather tube on an air cleaner side one end of which is connected to the collecting part and the other end of which is connected to the air cleaner, wherein:
the collecting part is provided over a connection of the breather tube on the case side and the breather on the case side, below a connection of the breather tube on the cylinder head side and the breather on the cylinder head side and below a connection of the breather tube on the air cleaner side and the air cleaner,
wherein the inside diameter of the breather tube on the air cleaner side is larger than each inside diameter of the breather tube on the case side and the breather tube on the cylinder head side.

2. The internal combustion engine blowby gas crankcase emission control system according to claim 1, wherein:
the breather tube on the air cleaner side is directed upwardly from a connection with the collecting part.

3. The internal combustion engine blowby gas crankcase emission control system according to claim 1, wherein the collecting part is a three-way fining for receiving the breather tube on the case side in a first fitting, the breather tube from the cylinder side in a second fining and the breather tube on the air cleaner side in a third fitting.

4. The internal combustion engine blowby gas crankcase emission control system according to claim 3, wherein said third fitting projects upwardly relative to said first and second fittings.

5. The internal combustion engine blowby gas crankcase emission control system according to claim 1, and further including an introduction pipe for connecting the breather on the case side with a crank chamber.

6. The internal combustion engine blowby gas crankcase emission control system according to claim 5, wherein the introduction pipe is an L-shaped pipe for functioning as part of a labyrinth structure for preventing oil from directly invading the breather on the case side.

7. The internal combustion engine blowby gas crankcase emission control system according to claim 1, wherein the breather on the cylinder head side is provided on an upper portion of a cylinder head cover wherein an oil component included in the blowby gas flows inside the breather on the cylinder head side to be separated.

8. The internal combustion engine blowby gas crankcase emission control system according to claim 7, and further including a connecting pipe for connecting the breather on the cylinder head side with the breather tube on the cylinder head side.

9. An internal combustion engine blowby gas crankcase emission control system, comprising:
a breather on a case side for separating a liquid component included in a blowby gas in a crankcase;
a breather on a cylinder head side for separating a liquid component included in a blowby gas on the cylinder head side;
a breather tube on the case side including a proximal end and a distal end, said proximal end being connected to the breather on the case side;
a breather tube on the cylinder head side including a proximal end and a distal end, said proximal end being connected to the breather on the cylinder head side;
a collecting part formed as a three-forked pipe to which the distal end of the breather tube on the case side and the distal end of the breather tube on the cylinder head side are connected; and
a breather tube on an air cleaner side including a proximal end and a distal end, said proximal end being connected to the collecting part and the distal end being connected to the air cleaner;
wherein the collecting part is provided above a connection of the breather tube on the case side and the breather on the case side, below a connection of the breather tube on the cylinder head side and the breather on the cylinder head side and below a connection of the breather tube on the air cleaner side and the air cleaner.

10. The internal combustion engine blowby gas crankcase emission control system according to claim 9, wherein:
the breather tube on the air cleaner side is directed upwardly from a connection with the collecting part.

11. The internal combustion engine blowby gas crankcase emission control system according to claim 9, wherein:
the inside diameter of the breather tube on the air cleaner side is larger than each inside diameter of the breather tube on the case side and the breather tube on the cylinder head side.

12. The internal combustion engine blowby gas crankcase emission control system according to claim 10, wherein:
the inside diameter of the breather tube on the air cleaner side is larger than each inside diameter of the breather tube on the case side and the breather tube on the cylinder head side.

13. The internal combustion engine blowby gas crankcase emission control system according to claim 9, wherein the collecting part receives the breather tube on the case side in a lower fitting, the breather tube from the cylinder side in a side fitting, and the breather tube on the air cleaner side in an upper fitting.

14. The internal combustion engine blowby gas crankcase emission control system according to claim 13, wherein said third fitting projects upwardly relative to said first and second fittings.

15. The internal combustion engine blowby gas crankcase emission control system according to claim 9, and further including an introduction pipe for connecting the breather on the case side with a crank chamber.

16. The internal combustion engine blowby gas crankcase emission control system according to claim 15, wherein the introduction pipe is an L-shaped pipe for functioning as part of a labyrinth structure for preventing fluid from directly invading the breather on the case side.

17. The internal combustion engine blowby gas crankcase emission control system according to claim 9, wherein the breather on the cylinder head side is provided on an upper portion of a cylinder head cover wherein a fluid component included in the blowby gas flows inside the breather on the cylinder head side to be separated.

18. The internal combustion engine blowby gas crankcase emission control system according to claim 17, and further including a connecting pipe for connecting the breather on the cylinder head side with the breather tube on the cylinder head side.

* * * * *